(12) United States Patent
Hofmann

(10) Patent No.: US 12,101,012 B2
(45) Date of Patent: Sep. 24, 2024

(54) ACTUATOR WITH POT SHAPED HOUSING PARTS CONNECTED WITH HOLDING BRACKET HAVING ROUND NUT AND TENSIONING SCREW

(71) Applicant: AUMA Riester GmbH & Co. KG, Mullheim (DE)

(72) Inventor: Benjamin Hofmann, Heitersheim (DE)

(73) Assignee: AUMA Riester GmbH & Co. KG, Mullheim (DE)

( * ) Notice: Subject to any disclaimer, the term of this patent is extended or adjusted under 35 U.S.C. 154(b) by 336 days.

(21) Appl. No.: 17/113,194

(22) Filed: Dec. 7, 2020

(65) Prior Publication Data
US 2021/0184537 A1    Jun. 17, 2021

(30) Foreign Application Priority Data
Dec. 13, 2019   (DE) .......................... 102019134365.8

(51) Int. Cl.
| | |
|---|---|
| H02K 5/16 | (2006.01) |
| H02K 5/20 | (2006.01) |
| H02K 5/22 | (2006.01) |
| H02K 7/116 | (2006.01) |

(52) U.S. Cl.
CPC ............ *H02K 5/163* (2013.01); *H02K 5/207* (2021.01); *H02K 5/225* (2013.01); *H02K 7/116* (2013.01); *H02K 2205/09* (2013.01)

(58) Field of Classification Search
CPC ........ H02K 5/163; H02K 5/225; H02K 5/207; H02K 5/02; H02K 5/04; H02K 5/26; H02K 7/116; H02K 2205/09; F16K 27/00; F16K 31/04

USPC ...................................................... 310/89, 90
See application file for complete search history.

(56) References Cited

U.S. PATENT DOCUMENTS

| | | | | |
|---|---|---|---|---|
| 3,616,884 | A | | 11/1971 | Balz |
| 6,137,194 | A | * | 10/2000 | Haugseth ............... H02K 23/04 310/1 |
| 8,286,532 | B2 | * | 10/2012 | Konig ................. F16H 61/0006 74/606 R |
| 8,356,520 | B2 | * | 1/2013 | Hurst ...................... H02K 5/08 73/708 |
| 8,569,917 | B2 | * | 10/2013 | Tang .................... H02K 7/1166 310/68 B |
| 10,483,825 | B2 | * | 11/2019 | Crites .................... H02K 7/116 |
| 2003/0089871 | A1 | | 5/2003 | Hashimoto |
| 2004/0237677 | A1 | * | 12/2004 | Inagaki ................ H02K 5/1672 74/606 R |
| 2009/0295258 | A1 | * | 12/2009 | Caliendo ................ H02K 11/38 310/68 B |

(Continued)

FOREIGN PATENT DOCUMENTS

| | | | | |
|---|---|---|---|---|
| CN | 109863671 | A * | 6/2019 | ............... F16H 3/66 |
| CN | 111120338 | A * | 5/2020 | |

(Continued)

*Primary Examiner* — Maged M Almawri
(74) *Attorney, Agent, or Firm* — Volpe Koenig

(57) ABSTRACT

An actuator (1) is provided in which the actuator housing (2) has at least one actuator housing part (3) or (4). At least one component support (5) or (6) which serves as a support structure for at least one functional element of the actuator is disposed within the actuator housing (2). Furthermore, the at least one actuator housing part (3) or (4) is fastened to the component support (5) or (6).

21 Claims, 7 Drawing Sheets

(56) References Cited

U.S. PATENT DOCUMENTS

| | | | |
|---|---|---|---|
| 2012/0286629 A1* | 11/2012 | Johnson | H02K 29/08 |
| | | | 310/68 B |
| 2014/0070673 A1* | 3/2014 | Caliendo | H02K 7/116 |
| | | | 310/68 B |
| 2016/0380509 A1* | 12/2016 | Crites | H02K 5/04 |
| | | | 310/68 B |

FOREIGN PATENT DOCUMENTS

| | | | | |
|---|---|---|---|---|
| CN | 111345262 A * | 6/2020 | | |
| CN | 111361358 A * | 7/2020 | | |
| CN | 113708596 A * | 11/2021 | | |
| CN | 114977606 A * | 8/2022 | | |
| DE | 2243896 B1 * | 9/1972 | | |
| DE | 2243896 | 12/1973 | | |
| DE | 10001138 A1 * | 7/2000 | | H02K 5/225 |
| DE | 10313274 | 2/2004 | | |
| DE | 10259582 | 7/2004 | | |
| DE | 102006054186 | 5/2008 | | |
| DE | 102008028950 A1 * | 2/2009 | | H02K 7/116 |
| DE | 102011075706 | 9/2012 | | |
| DE | 102008028950 | 10/2012 | | |
| DE | 102014216708 | 3/2015 | | |
| DE | 102014216708 A1 * | 3/2015 | | H02K 5/04 |
| DE | 102017209170 | 12/2018 | | |
| EP | 0279043 | 12/1987 | | |
| JP | 2004115002 | 4/2004 | | |
| WO | WO-2007076976 A1 * | 7/2007 | | F16H 57/027 |
| WO | WO-2008037528 A1 * | 4/2008 | | F16H 57/027 |
| WO | WO-2015000475 A2 * | 1/2015 | | H02K 11/25 |
| WO | WO-2016124715 A1 * | 8/2016 | | H02K 11/215 |
| WO | 2019198514 | 10/2019 | | |

\* cited by examiner though perhaps not for every actuator housing part can be provided between the respective actuator housing part and the fastening flange.

ACTUATOR WITH POT SHAPED HOUSING PARTS CONNECTED WITH HOLDING BRACKET HAVING ROUND NUT AND TENSIONING SCREW

INCORPORATION BY REFERENCE

The following documents are incorporated herein by reference as if fully set forth: German Patent Application No. 10 2019 134 365.8, filed Dec. 13, 2019.

TECHNICAL FIELD

The invention relates to actuators which in various embodiments are already known from the prior art and practice.

BACKGROUND

Actuators typically have an actuator housing in which at least one functional element, for example an actuating-mechanism functional element of the actuator, is disposed. Actuating-mechanism functional elements can be, for example, a drive motor and/or a gear unit. Actuators are used, inter alia, for activating fittings and/or valves.

The actuator housings of actuators already known from practice are typically produced from cast aluminum and/or cast iron. On account thereof, the actuator housings are generally very stable and able to well protect the functional elements disposed therein against external influences. Based on their stability, the already known actuator housings are also capable of absorbing forces which act on the actuator during the operation. These properties which are advantageous per se are however associated with a certain complexity in terms of the production of the actuator housings. Assembling, servicing and/or replacing the functional elements which are disposed within the actuator housings often is also comparatively difficult by virtue of the construction of the actuator housings.

SUMMARY

It is therefore an object of the invention to achieve actuators of the type mentioned at the outset, the production and handling of said actuators being simplified.

In order for the object to be achieved, an actuator having one or more features of the invention that are directed toward an actuator of this type is provided. In order for the object to be achieved, an actuator having an actuator housing which comprises at least one preferably pot-shaped actuator housing part is thus in particular provided, wherein the actuator has at least one component support which is disposed within the actuator housing and which supports at least one functional element, in particular an actuating-mechanism functional element, of the actuator, and to which the at least one actuator housing part is fastened.

In the actuators already known to date from practice, the functional elements which are disposed within the actuator housings are not only protected by the actuator housings but also supported by the latter. In the actuator according to the invention, the component support which supports the at least one functional element of the actuator is provided. In this way it is possible for the at least one functional element, for example a drive motor and/or a gear unit of the actuator, to be assembled on the component support before the latter is incorporated in the at least one, preferably pot-shaped, actuator housing part. This facilitates the assembly and, when required, also the replacement or repairing or servicing of the at least one functional element which is disposed on the component support and which in the use position of said functional element is encased by the actuator housing and therein per se is accessible only with difficulty.

In one preferred embodiment of the actuator the actuator housing has two in each case pot-shaped actuator housing parts. After the assembly of the at least one functional element of the actuator on the component support, the component support having the at least one actuating-mechanism element disposed thereon can first be inserted into the one pot-shaped actuator housing part. Subsequently, the actuator housing can be closed by placing the at least one further pot-shaped actuator housing part thereon, and the component support having the at least one functional element disposed thereon can be encased.

The component support thus functions as an internal holding structure for the at least one functional element, and upon closing the actuator housing also for the at least one actuator housing part which is disposed on the component support.

The supporting function in the actuator according to the invention is now no longer assumed by the actuator housing but by the component support which is disposed therein. The actuator housing, in particular the at least one, preferably pot-shaped, actuator housing part, can thus be of a simpler design, for example having less complexity in terms of material.

In order for the object to be achieved, an actuator having additional features as disclosed herein is also provided. In order for the object to be achieved an actuator in which at least one, preferably pot-shaped, actuator housing part of an actuator housing of the actuator is produced from a thin-walled material having a material thickness of at most four millimeters, in particular of at most two millimeters, is thus in particular proposed. It is also possible that at least one actuator housing part of the actuator housing is composed of a sheet metal, in particular of a stainless steel sheet. It is also possible that at least one actuator housing part of the actuator housing of the actuator is composed of plastics material. An actuator housing part that is composed of plastics material can above all have a material thickness, which can also be referred to as the wall thickness, of at most four millimeters.

In this way, an actuator having an actuator housing which can be produced in a simple and above all cost-effective manner is achieved.

According to one embodiment of the actuator it is provided that the latter combines the features of the two actuator embodiments discussed above.

In one embodiment of the previously mentioned actuator it is provided that the component support or a further component support has a fastening flange to which the at least one actuator housing part of the actuator housing is fastened. In this way, the component support can also be used as a support structure for at least one part of the actuator housing.

In an actuator housing which comprises at least two actuator housing parts it can be provided that the component support has a fastening flange to which the at least two actuator housing parts of the actuator housing are fastened.

In order to be able to seal a joint between the fastening flange and the at least one actuator housing part, it can be expedient for a seal, in particular an O-ring, to be disposed between the fastening flange and the at least one actuator housing. In the case of a plurality of actuator housing parts which are connected to the fastening flange of the component support, one seal of this type, in particular in each case one O-ring, can in each case be disposed between each of the actuator housing parts and the fastening flange.

It is furthermore possible that the component support is disposed on a pot base, in particular fastened thereto, of an actuator housing part of the actuator housing, for example of the actuator housing part of the actuator housing already mentioned above.

The component support of the actuator can furthermore form a bearing for an output shaft of the actuator and/or have such a bearing. In this way, a separate bearing for mounting the output shaft within the actuator housing can be dispensed with. This too can simplify the construction of the actuator housing.

In one embodiment of the actuator it is provided that a drive motor of the actuator as an actuating-mechanism element is supported and/or disposed on the component support. The drive motor of the actuator can in particular be supported and/or disposed on the component support by way of the motor housing of said drive motor. It is furthermore possible that the at least one actuator housing part is unstressed in terms of a drive torque generated by a drive motor, for example by the previously mentioned drive motor. The component support can thus not only be a supporting but also a force-conducting structure of the actuator. The at least one actuator housing part can thus remain largely unstressed and consequently be configured in a comparatively delicate manner. This facilitates a simple and cost-effective production of the at least one actuator housing part.

The component support of the actuator can penetrate the actuator housing. The component support can thus protrude from the actuator housing. The component support herein, in particular on the portion thereof that protrudes from the actuator housing, can have an assembly interface for a fitting and/or for a slave gear unit. In this way, it becomes possible to establish a connection between the actuator and a slave gear unit or a fitting directly by way of the component support that serves as a supporting structure, and to largely destress the actuator housing. This too facilitates an ideally delicate design of the at least one actuator housing part of the actuator housing. At least one component support of the actuator can be configured as an electronics support. At least one component support of the actuator can be configured as a motor support. It is also possible for the actuator to have a component support which is configured as an electronics support, as a support for actuating-mechanism functional elements of the actuator and/or as a motor support.

Electronic components, in particular a control circuit board of the actuator, can be disposed on the electronics support. The motor support can serve for receiving a drive motor of the actuator, to the extent that the drive motor of the actuator is not disposed on the component support. The electronics support as well as the motor support can be disposed within the actuator housing. The electronics support and/or the motor support can likewise be disposed on the component support and/or be fastened to said component support and/or be connected to said component support.

A component support can serve as a foundation for further supports for functional units of the actuator, without the further functional units such as, for example, the drive motor and/or electronic components of the actuator, having to be held by the actuator housing. When a separate motor support which may be connected to the component support is used, it is possible for example for only one gear or else a plurality of gears of the actuator to be disposed on the component support.

The actuator can furthermore have an axial compensation element, for example for at least one actuating-mechanism element of the actuator. The axial compensation element herein can be disposed or configured on the component support, for example. An axial spring can serve as the axial compensation element. Any redundancy when closing the actuator housing can be avoided with the aid of the at least one axial compensation element. Moreover, production or fitting tolerances of elements which are disposed within the actuator housing can be compensated for with the aid of the at least one axial compensation element.

Actuating-mechanism elements such as, for example, a drive train, a powertrain, a gear unit and/or a drive motor of the actuator can be provided as functional elements.

It is to be noted at this point that the at least one component support can be configured in multiple parts. It is furthermore possible that the component support is connected to the at least one actuator housing part of the actuator housing of the actuator at at least two locations which are axially mutually spaced apart.

A component support, for example the electronics support already mentioned above, can at least in portions be disposed beyond a separation plane of at least two actuator housing parts. A separate electronics support herein can be disposed on the component support of the actuator, as has already been mentioned above. It is thus possible for the electronics support to be accessible to a user of the actuator when one of the at least two actuator housing parts has been removed from the at least one other actuator housing part. Adjustments on the electronics of the actuator that are disposed on the electronics support can thus be performed in the case of an opened actuator housing without the component support having to be removed from the other actuator housing part. In this way, the one actuator housing part of the actuator housing can thus function as a cap or cover which can be removed from the other actuator housing part when required, should access to the electronics of the actuator be necessary.

At least one, for example the at least one, component support can axially penetrate the at least one actuator housing part and configure a flange face for a fitting flange. It is thus possible for the actuator to be fastened to a fitting flange by way of the flange face that is configured on the component support. Since any introduction of force herein takes place by way of the component support, stresses of the actuator housing can be largely avoided also on account thereof.

The actuator housing can be sealed by a seal, in particular by an O-ring. The seal herein can be disposed along an encircling line, in particular wherein the encircling line can be formed by a bent feature of a preferably pot-shaped actuator housing part of the actuator. In this way, the seal can be established in a particularly reliable manner on the at least one actuator housing part. If the actuator housing part is removed, the seal remains fixed to the component support, on account of which any unintentional loss of the seal, or the separate handling of said seal, respectively, can be avoided.

The at least one pot-shaped actuator housing part is preferably composed of thin-walled material. This facilitates the production of the pot-shaped actuator housing part, for example by deep-drawing.

In an actuator housing which is composed of at least two actuator housing parts the at least two actuator housing parts can be connected to one another and/or to the at least one component support, in particular to the fastening flange of said component support, by at least one tensioning element. With the aid of the at least one tensioning element it is possible to connect the actuator housing parts of the actuator housing to one another in a comparatively simple manner. Depending on the configuration of the at least one tensioning element, this can even take place without tools. A tensioning lock can be used as the tensioning element.

The at least one actuator housing part can have a flange. With the aid of the flange it is possible for the at least one actuator housing part to be connected to the component support. In an actuator housing which comprises at least two actuator housing parts, it can be expedient for both actuator housing parts to have in each case one flange. In this way it is possible to connect both actuator housing parts to the component support of the actuator. To this end, the flanges of the two actuator housing parts can be connected to the fastening flange of the component support, for example.

The flange/the flanges can in each case have at least one slot which for receiving a tensioning screw of a tensioning element is open on the periphery. The at least one actuator housing part can be connected to the component support and/or the at least two actuator housing parts can be connected to one another and/or to the component support of the actuator by way of the at least one tensioning element, for example by way of a tension lock.

The tensioning element mentioned above can comprise a holding bracket, a round nut which is held by the holding bracket, and a tensioning screw. The round nut herein can be rotatable in the holding bracket so as to move the tensioning screw to a tensioning position. The tensioning element can be disposed on the at least one actuator housing part with the aid of the holding bracket. To this end, it can be advantageous for at least one actuator housing part of the actuator housing to have a holding bead and/or a flared holding rim for the holding bracket. The holding bead and/or the flared holding rim for the holding bracket herein can be configured for example on a flange of the actuator housing part, for example on the flange already mentioned above.

The holding bracket can furthermore have a preferably centric recess. It is thus possible for the round nut having the tensioning screw within the holding bracket to be moved between an open position and a tensioning position, for example the tensioning position already mentioned above. To this end, the holding bracket does not have to be removed from the at least one actuator housing part. The tensioning screw in the tensioning position can penetrate a slot on the one actuator housing part as well as another slot on another actuator housing part and/or a slot on a fastening flange of the actuator, for example the fastening flange already mentioned above. Once the tensioning element, in particular the tensioning screw, has been tensioned, a form-fitting and/or force-fitting connection can be established between the at least one actuator housing part, a further actuator housing part and/or the component support of the actuator that has already been mentioned above.

In order for the object to be achieved, an actuator which has further features as discussed herein is furthermore provided. In order for the object to be achieved, it is thus in particular provided that an actuator housing of the actuator, for example the actuator housing already mentioned above, has an assembly window for routing a connector cable from the interior of the actuator housing.

The assembly window can preferably be configured in an actuator housing part of the actuator housing. With the aid of the assembly window it is possible to significantly simplify the electrical connection of the actuator. On account of the comparatively large assembly window it is specifically possible to guide a connector cable out of the interior of the actuator housing without any great difficulties.

The actuator can have a closure aperture which comprises at least one cable conduit for a connector cable and by way of which the assembly window upon assembling the actuator is able to be closed and/or is closed. As soon as the at least one connector cable has been routed through the assembly window to the outside, the connector cable can be guided through the cable conduit of the closure aperture, and the assembly window can then be closed by the closure aperture.

It can be advantageous herein for the closure aperture to be able to be released and/or completely removed from the outside. The closure aperture can thus be removed in a relatively simple manner from the outside without the actuator housing of the actuator having to be opened to this end. This can significantly simplify the access to the electrical connection and the electrical connector cable of the actuator.

The closure aperture herein can have at least one ventilating and/or venting bore. An exchange between the interior of the actuator housing and the environment is possible in this way. For example, air humidity from the interior of the actuator housing can thus escape to the outside. The ventilating and/or venting bore can be provided with a pressure compensation element which is permeable to air and/or vapor but impermeable to water. A passage of air, in particular of humid air, through the ventilating and/or venting bore is possible in this way, while liquid water cannot pass through the ventilating and/or venting bore.

The at least one cable conduit of the closure aperture can be configured as a cable screw-fitting. In another embodiment, at least one cable conduit of the closure aperture can be configured as a plug connection. In this way, different connection possibilities for establishing the electrical connection of the actuator are provided.

In one embodiment of the actuator the actuator housing can have an external housing cabinet. The housing cabinet can externally surround an assembly window, for example the assembly window already mentioned above. The housing cabinet can serve for receiving functional elements of the actuator that by virtue of the available space conditions cannot be accommodated within the actuator housing. Electrical and/or electronic functional elements of the actuator can in particular be accommodated within the housing cabinet so as to be spatially separated from the interior of the actuator housing.

BRIEF DESCRIPTION OF THE DRAWINGS

Exemplary embodiments of the invention are explained in more detail hereunder by the figures. It is to be noted that the invention is not limited to the exemplary embodiments shown in the figures. Further exemplary embodiments of the invention are derived by combining the features of the claims directed toward the actuators and/or by combining the features included in the specification and/or in the description of the figures hereunder. In the figures, to some extent in a highly schematic illustration:

DETAILED DESCRIPTION

All figures show at least parts of an actuator which in its entirety is identified by the reference sign 1.

Figure 13:
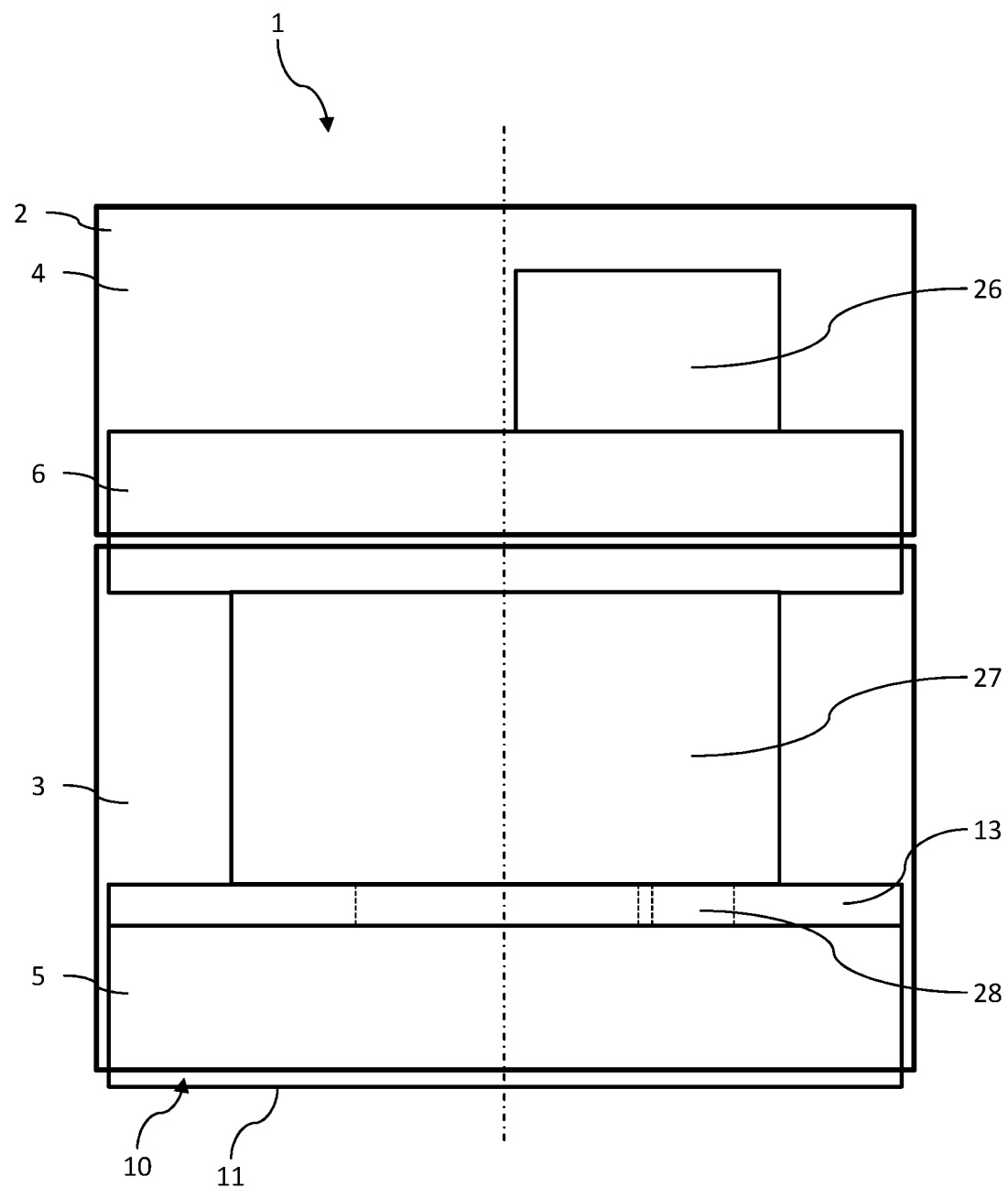
FIG. 13 shows a diagram of an actuator having an actuator housing, two component supports situated in the latter, wherein a drive motor is disposed on the upper component support, and a gear unit and an axial compensation element are disposed between the component supports.

Each of the actuators 1 shown has an actuator housing 2 which comprises a lower pot-shaped actuator housing part 3 and an upper pot-shaped actuator housing part 4. In the exemplary embodiments of the actuators 1 shown in the figures, two component supports 5 and 6 are disposed within the actuator housing 2. The component supports 5 and 6 serve for supporting functional elements, specifically a drive motor 26 and a gear unit 27 of the actuator 1. The arrangement of the drive motor 26 on the upper component support 6 and the arrangement of the gear unit 27 between the component supports 5 and 6 can be seen in the diagram of FIG. 13.

Not only the drive motor 26 of the actuator 1, but also both actuator housing parts 3 and 4, are disposed on the upper component support 6 of the two component supports 5 and 6. The drive motor 26 of the actuator 1 as well as the two actuator housing parts 3 and 4 are fastened to the upper component support 6.

Both actuator housing parts 3 and 4 are composed of a thin-walled material having a material thickness of at most four millimeters, preferably of at most two millimeters. Depending on requirements, the two actuator housing parts 3 and 4 herein can be composed of sheet metal, for example of stainless steel sheet, or else of plastics material. The upper component support 6 of the two component supports 5 and 6 has a fastening flange 7. The two actuator housing parts 3 and 4 of the actuator housing 2 are fastened to the fastening flange 7. A seal, for example an O-ring, by way of which the closed actuator housing 2 is sealed, for example in relation to the ingress of moisture, is in each case provided between the fastening flange 7 and the two actuator housing parts 3 and 4.

The lower component support 5 is disposed on a pot base 8 of the lower actuator housing part 3.

At least the lower component support 5 of the two component supports 5 and 6 forms a bearing 9 for an output shaft (not shown in the figures) of the actuator 1. The drive motor 26 of the actuator 1 is supported on the upper component support 6 by way of the motor housing of said drive motor 26. The support of the drive motor 26 of the actuator 1 is designed such that both actuator housing parts 3 and 4 remain unstressed in terms of a drive torque generated by the drive motor 26.

Figure 4:
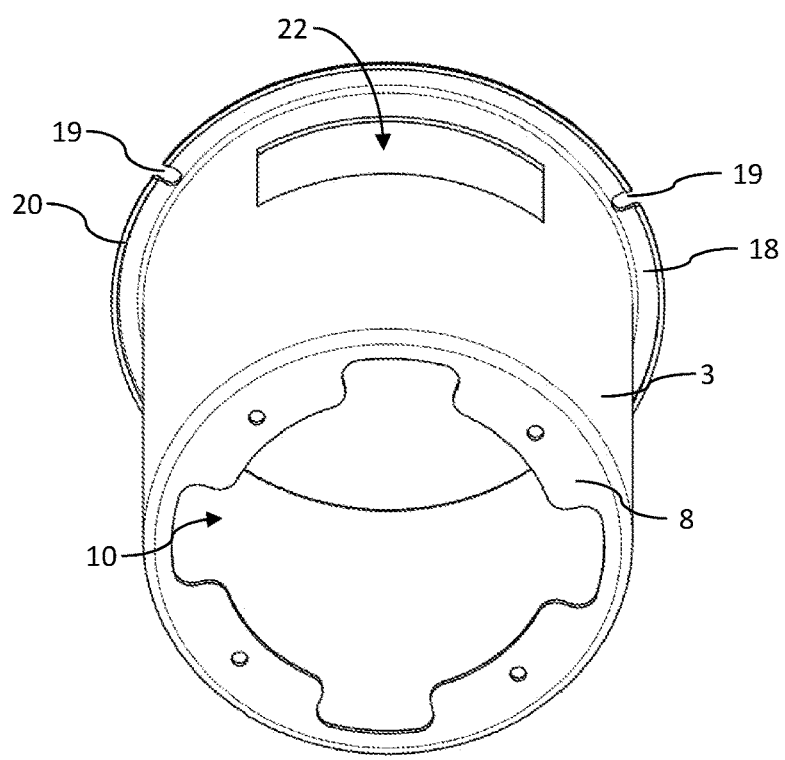
Figure 5:
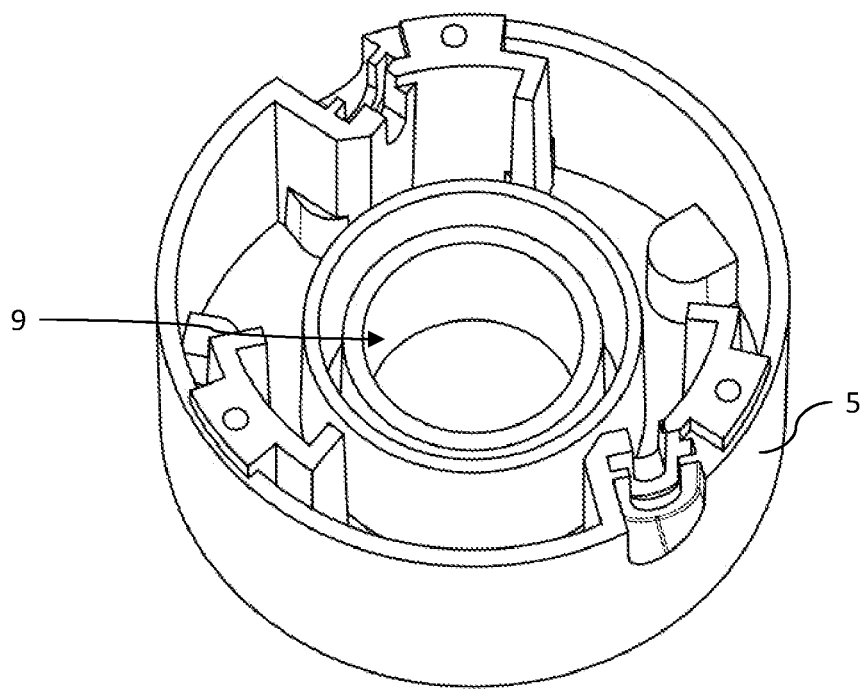
FIGS. 5 and 6 show different views of a component support which according to the sectional view from FIG. 2 is disposed in the lower actuator housing part.
Figure 6:
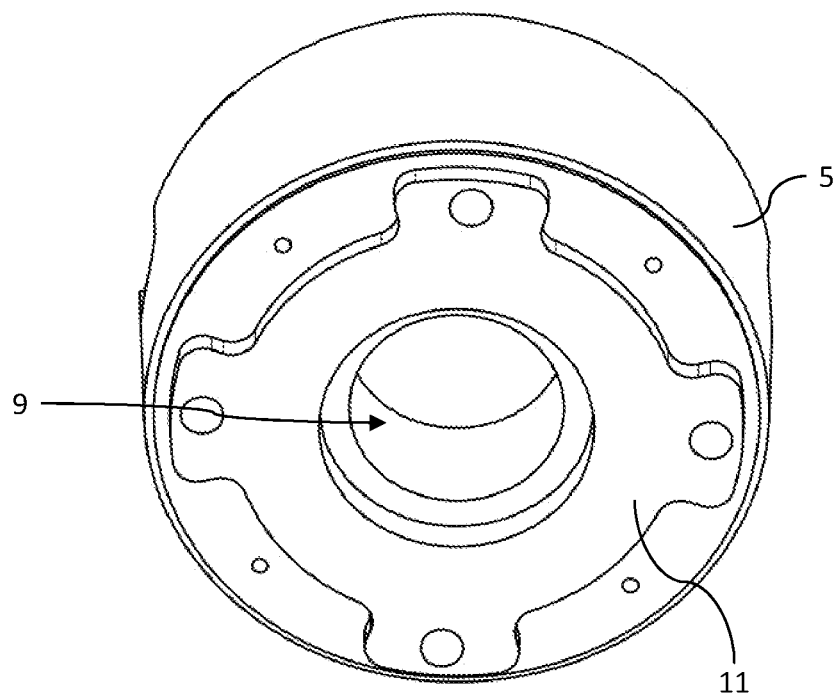

The lower component support 5 of the two component supports 5 and 6 penetrates the actuator housing 2. To this end, the lower actuator housing part 3 has an opening 10 which can be particularly readily identified in FIG. 4. The lower component support 5 on the portion thereof that protrudes from the actuator housing 2 has an assembly interface 11 for a fitting and/or a slave gear unit. The upper component support 6 is configured not only as a motor support but also as an electronics support.

Figure 1:
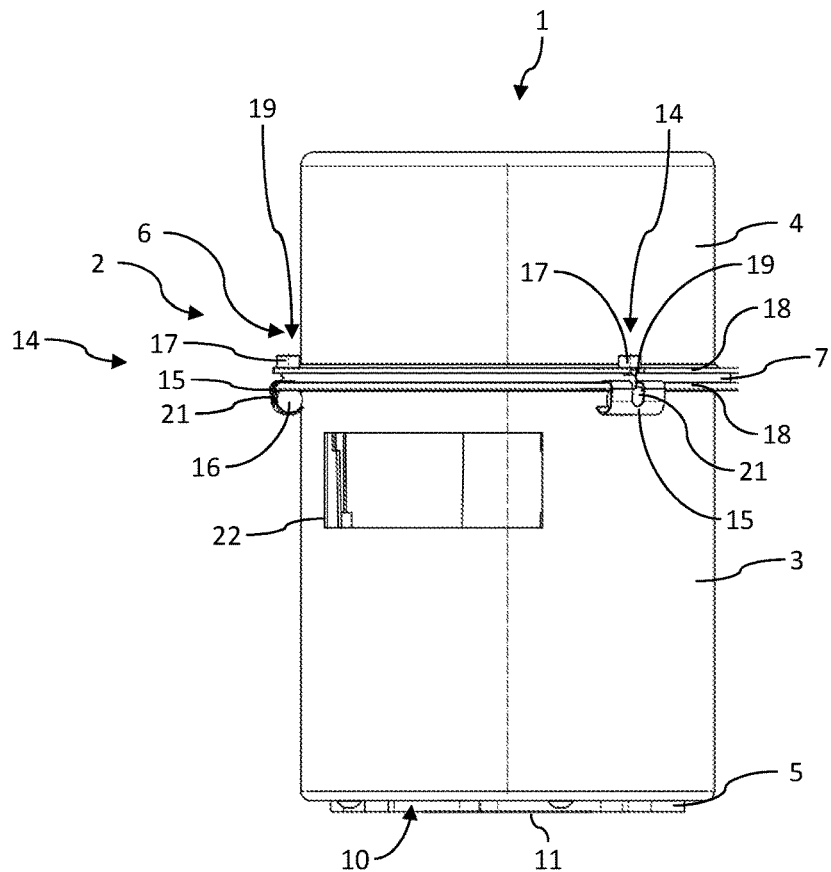
FIG. 1 shows a lateral view of an actuator, wherein an assembly window for routing a connector cable can be seen in a lower of two actuator housing parts.
Figure 2:
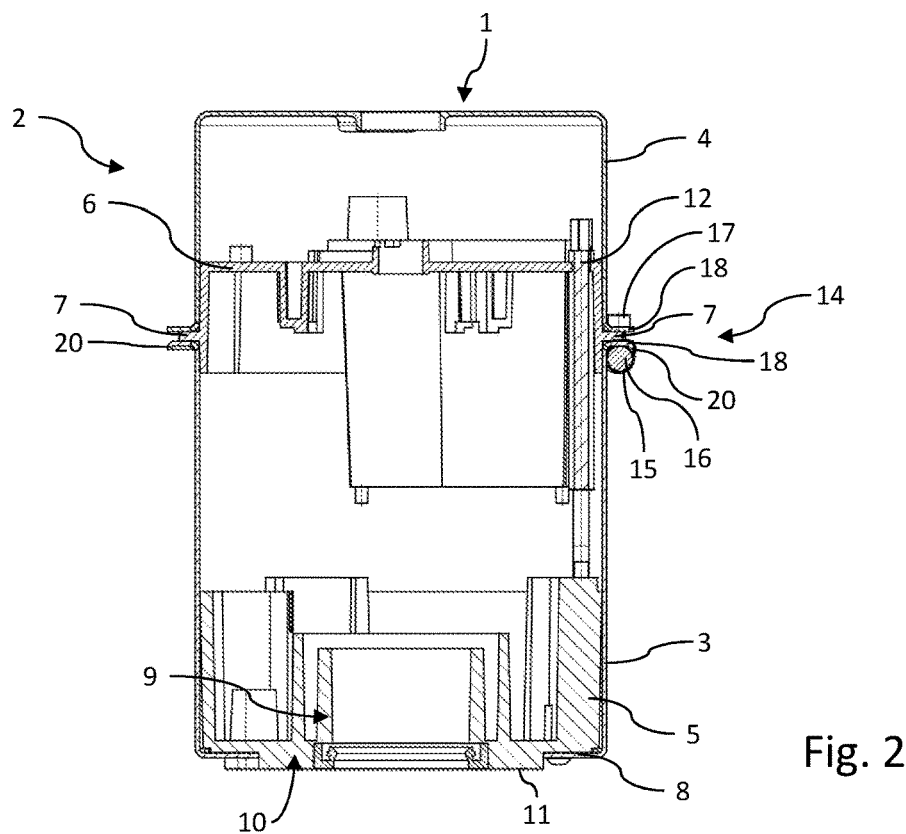
FIG. 2 shows a sectional lateral view of the actuator illustrated in FIG. 1.
Figure 3:
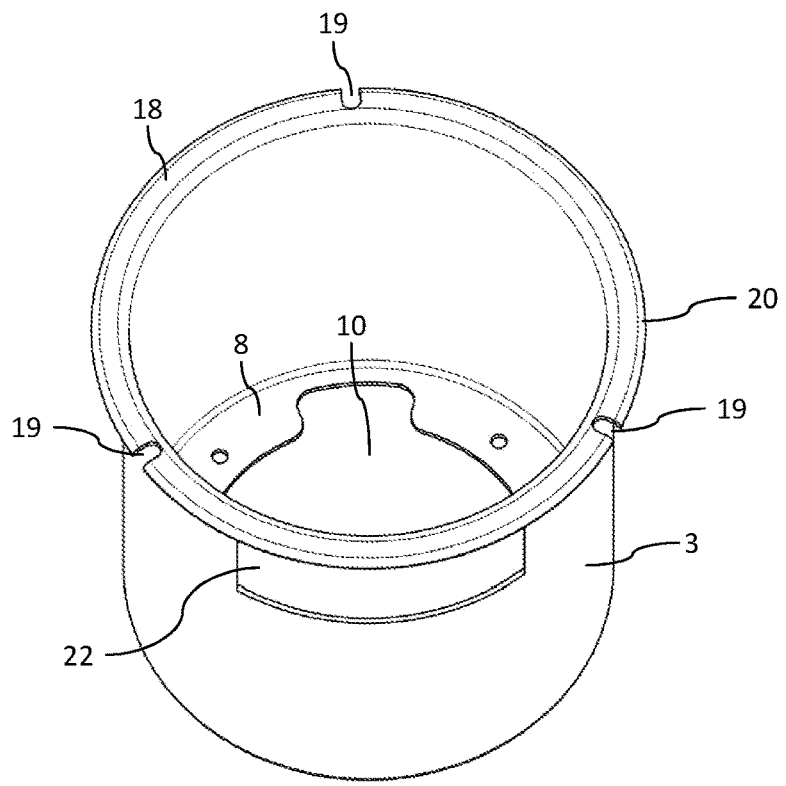
FIGS. 3 and 4 show different perspective views of the lower actuator housing part.

The sectional illustration according to FIG. 2 highlights that the upper component support 6 is connected to the lower component support 5 by way of an actuating element 12. The actuating element 12 serves in enabling the adjustment of a detent (not shown in the figures) of the actuator 1 without having to remove the lower component support 5 from the lower actuator housing part 3. For the adjustment it is sufficient for the upper actuator housing part 4 to be removed from the lower actuator housing part 3. The illustration from FIG. 2 highlights that, on account thereof, an activation end of the actuating element 12 is accessible to a user of the actuator.

Figure 12:
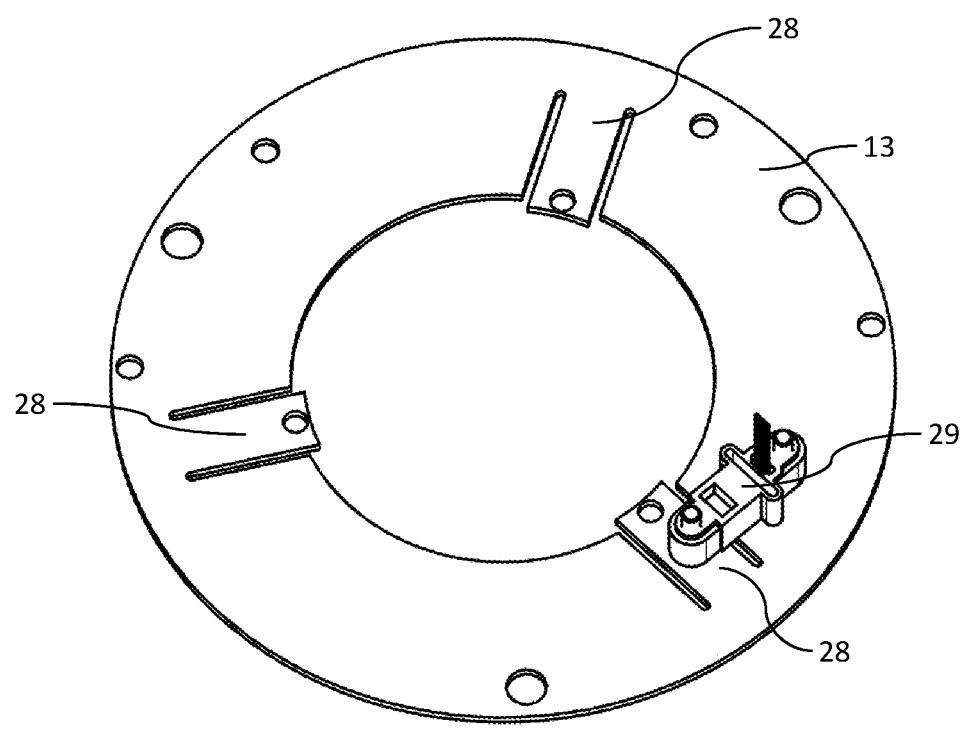
FIG. 12 shows a perspective view of an axial compensation element, the deformation thereof being able to be detected by a sensor so as to measure forces or moments, in particular a torque, bearing thereon.

The upper component support 6 has an axial compensation element 13. The axial compensation element 13 is illustrated as a separate part in FIG. 12 and can also be seen in the diagram of FIG. 13. The axial compensation element 13 comprises three sprung tongues 28 which permit an axial compensation or an axial displacement of the components, here the gear unit 27, that are disposed on the axial compensation element 13, within the actuator housing 2. According to FIG. 12, one of the tongues 28 is provided with a sensor 29. The sensor 29 can detect a deformation and/or a movement of the axial compensation element 13, or of the tongue 28, respectively. Applied forces and/or moments and/or torques can be derived from the deformation or movement, respectively.

The upper component support 6 is at least in part disposed beyond a separation plane of the two actuator housing parts 3 and 4. The component support 6 and functional elements disposed thereon are thus accessible when the upper actuator housing part 4 is removed from the lower actuator housing part 3, thus the actuator housing 2 is opened.

As has already been explained above, the lower component support 5 axially penetrates the lower actuator housing part 3. The lower component support 5 on an end side that protrudes from the lower actuator housing part 3 has a flange face as an assembly interface 11 for a fitting flange.

The actuator housing 2 is sealed by a seal, as has already been explained above. The seal here comprises at least two O-rings which are not illustrated in the figures but are disposed between the two actuator housing parts 3 and 4 and the fastening flange 7 of the upper component support 6. The seal herein can be disposed along an encircling line. The encircling line herein can be formed by a bent feature of the in each case pot-shaped actuator housing parts 3 and 4.

Figure 7:
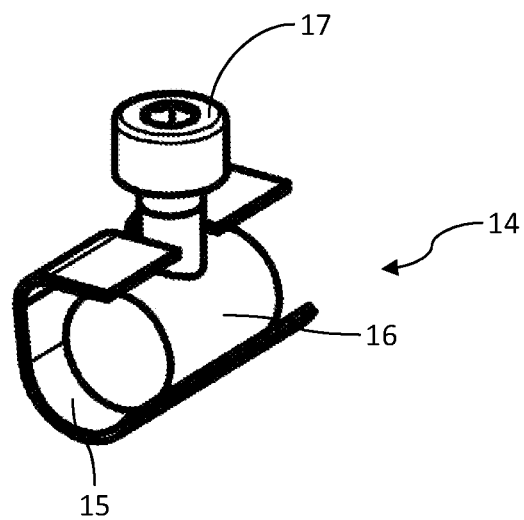
FIG. 7 shows an individual-part illustration of a tensioning element in the form of a tension lock of the actuator, wherein the tension lock comprises a holding bracket, a round nut and a tensioning screw that is connected to the round nut.
Figure 8:
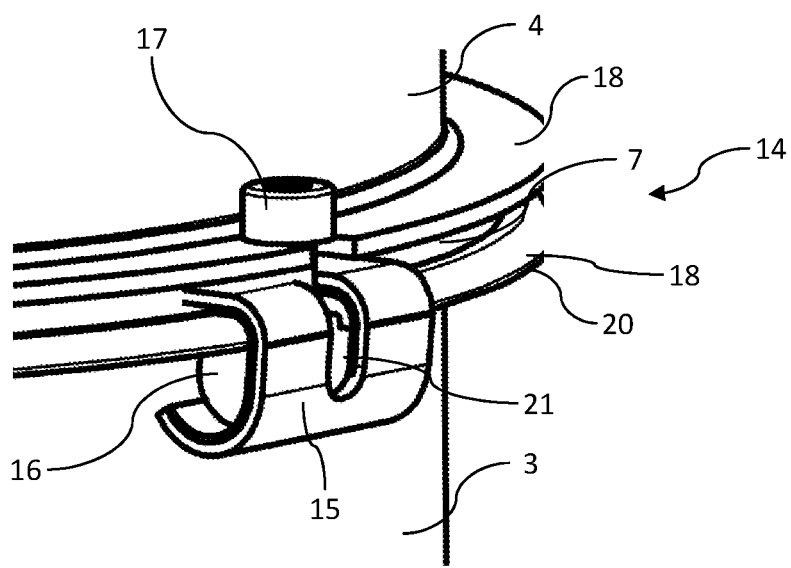
FIG. 8 shows the tension lock shown in FIG. 7 in the use position on the actuator illustrated in the previous figures.
Figure 9:
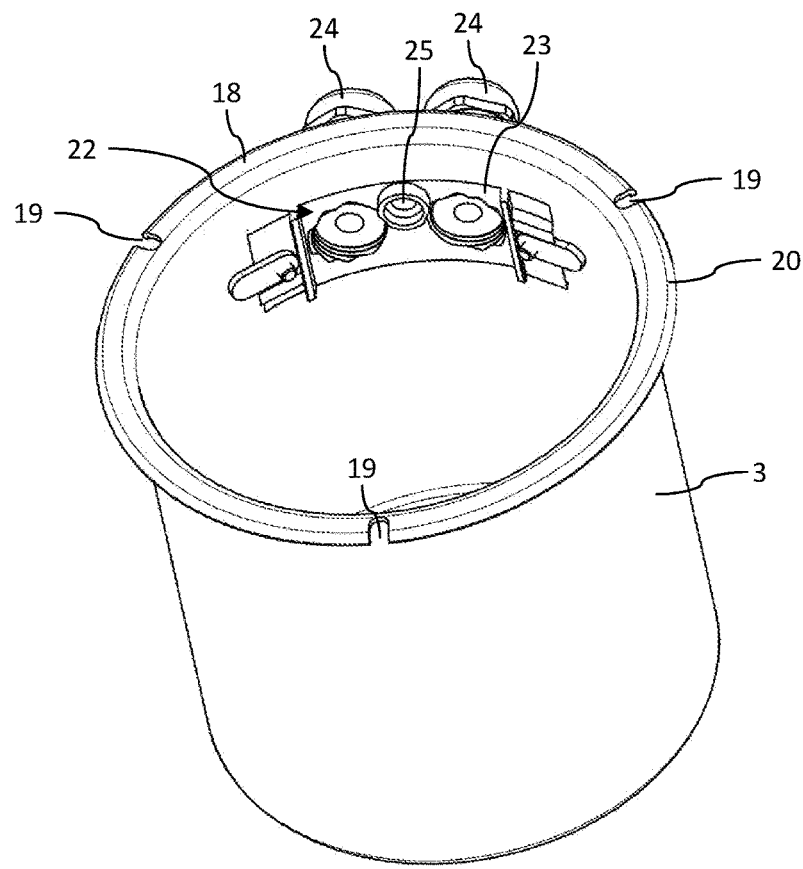
FIG. 9 shows a perspective view of the lower actuator housing part having a closure aperture which closes the assembly window and on which two cable conduits are configured.

The two actuator housing parts 3 and 4 are connected to one another and to the upper component support 6 by the total of three tensioning element 14 which are in each case configured as tension locks. One of the tensioning element 14 is separately illustrated in FIG. 7. According to FIG. 7, the tensioning element 14 has a holding bracket 15, a round nut 16 which is held by the holding bracket 15, as well as a tensioning screw 17. The round nut 16 is held so as to be rotatable in the holding bracket 15 such that the tensioning screw 17 can be moved from a releasing position to the tensioning position of said tensioning screw 17 that is shown in FIGS. 7 and 8.

Both actuator housing parts 3 and 4 have in each case one flange 18. The flanges 18 are provided with in each case a total of three slots 19 which for receiving the tensioning screws 17 of the tensioning element 14 are open on the periphery. The lower actuator housing part 3 is provided with a holding bead 20 for the holding brackets 15 of the tensioning element 14. The holding bead 20 herein is configured on the flange 18 of the lower actuator housing part 3. The holding brackets 15 of the tensioning element 14 are clip-fitted in the holding bead 20. The holding bead 20 thus serves for captively fastening the holding brackets 15 on the lower actuator housing part 3. The holding bead 20 can be formed by a flared holding rim 20, for example. The holding bead 20 can be readily seen in FIG. 8, for example.

Each of the holding brackets 15 has a centric recess 21. The recess 21 serves for moving the round nut 16 having the tensioning screw 17 between a releasing position or open position and the tensioning position within the respective holding bracket 15.

The actuator housing 2 of the actuators 1 shown in the figures, here more specifically the lower actuator housing part 3 of the two actuator housing parts 3 and 4, is equipped with an assembly window 22. The assembly window 22 serves for routing a connector cable (not shown in the figures) from the interior of the actuator housing 2 and thus for simplified assembly of the actuator 1 and for simplified electrical wiring of the functional elements which are disposed within the actuator housing 2, in particular the drive motor 26 of the actuator 1.

Figure 10:
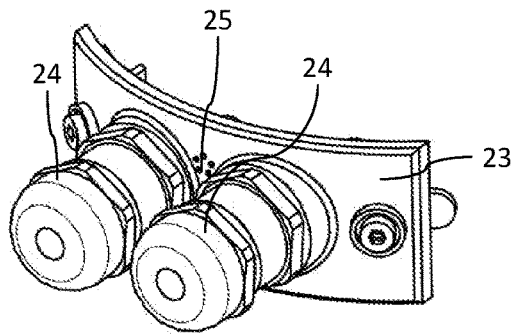
FIG. 10 shows a perspective front view of the closure aperture shown in FIG. 9, having the two cable conduits of said closure aperture.
Figure 11:
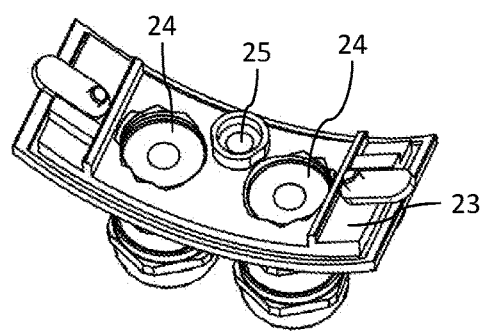
FIG. 11 shows a perspective rear view of the closure aperture shown in FIG. 10.

The actuators 1 are equipped with a closure aperture 23 by way of which the respective assembly window 22 can be closed once the electrical connection of the actuator 1 has been established. The closure aperture 23 shown in the figures has two cable conduits 24 for connector cables of the actuator 1. FIGS. 10 and 11 show the closure aperture 23 having the two cable conduits 24 thereof. The closure aperture 23, in the case of an otherwise closed actuator housing 2, can be released and completely removed from the outside.

According to FIG. 10 the closure aperture 23 is equipped with a plurality of ventilating and/or venting bores 25. An exchange between the interior of the actuator housing 2 and the environment is possible by way of the ventilating and/or venting bores 25. A pressure compensation element is disposed on the internal side of the venting bores 25 such that only air, in particularly only humid air, but no liquid water can enter or exit.

The two cable conduits 24 that are present on the closure aperture 23 are configured as cable screw-fittings.

The invention relates to improvements in the technical field of actuators. Proposed, inter alia, to this end is an actuator 1, the actuator housing 2 thereof having at least one actuator housing part 3 or 4. At least one component support 5 or 6 which serves as a support structure for at least one functional element of the actuator is disposed within the actuator housing 2. Furthermore, the at least one actuator housing part 3 or 4 is fastened to the component support 5 or 6.

LIST OF REFERENCE SIGNS

1 Actuator
2 Actuator housing
3 Lower actuator housing part
4 Upper actuator housing part
5 Lower component support
6 Upper component support
7 Fastening flange
8 Pot base
9 Bearing
10 Opening in 3
11 Assembly interface on 5
12 Actuating element
13 Compensation element
14 Tensioning element
15 Holding bracket
16 Round nut
17 Tensioning screw
18 Flange on 3 and 4
19 Slot
20 Flared holding rim
21 Recess
22 Assembly window
23 Closure aperture
24 Cable conduits
25 Ventilating and/or venting bore
26 Drive motor
27 Gear unit
28 Tongue on 13
29 Sensor on 13

The invention claimed is:

1. An actuator (1) comprising:
   an actuator housing (2) which comprises at least one actuator housing part (3, 4);
   an upper component support (6) and a lower component support (5) are each disposed within the actuator housing (2) and which support at least one functional element of the actuator (1), and the at least one actuator housing part (3, 4) is fastened to the upper component support (6); and
   a drive motor supported by the upper component support (6);
   wherein the lower component support (5) penetrates through the actuator housing (2) and protrudes from the actuator housing (2), such that a protruding portion includes an assembly interface (11) for at least one of a fitting or a slave gear unit; and
   wherein a connection between the upper component support (6) and the lower component support (5) and the at least one actuator housing part (3, 4) is configured to not conduct forces or moments to the at least one actuator housing part (3, 4) based on a drive torque generated by the drive motor.

2. The actuator as claimed in claim 1, wherein the at least one actuator housing part comprises first and second pot-shaped actuator housing parts, and the at least one functional element of the actuator comprises at least one of the drive motor (26) or a gear unit (27).

3. The actuator (1) as claimed in claim 1, wherein the at least one actuator housing part (3, 4) is at least one of formed of a thin-walled material having a material thickness of at most four millimeters, sheet metal, or plastics material.

4. The actuator (1) as claimed in claim 1, wherein the upper component support (6) includes a fastening flange (7) to which the at least one actuator housing part (3, 4) of the actuator housing (2) is fastened, and a seal is disposed between the fastening flange (7) and the at least one actuator housing part (3, 4).

5. The actuator (1) as claimed in claim 1, wherein the lower component support (5) is disposed on a pot base (8) of the at least one actuator housing part (3, 4) of the actuator housing (2).

6. The actuator (1) as claimed in claim 1, wherein the lower component support (5) at least one of forms or has a bearing (9) for an output shaft of the actuator (1).

7. The actuator (1) as claimed in claim 1, wherein the upper component support (6) is configured to receive at least one of an electronics support or motor support, and the actuator (1) further comprises at least one of an electronics support or motor support disposed within the actuator housing (2), and the at least one of the electronics support or the motor support is at least one of disposed on, connected to or fastened to the upper component support (6).

8. The actuator (1) as claimed in claim 1, further comprising at least one axial compensation element (13).

9. The actuator (1) as claimed in claim 1, wherein the at least one actuator housing part comprises first and second pot-shaped actuator housing parts, and the upper component support (6) is disposed beyond a separation plane of first and second actuator housing parts (3, 4) such that the upper component support (6) is accessible when one of the first or second actuator housing parts (3, 4) is removed from the other of the first or second actuator housing parts (3, 4), and wherein the lower component support (5) axially penetrates the actuator housing part (3, 4) and configures a flange face for a fitting flange.

10. The actuator (1) as claimed in claim 1, wherein the actuator housing (2) includes an assembly window (22) for routing a connector cable from an interior of the actuator housing (2).

11. The actuator (1) as claimed in claim 1, wherein the lower component support (5) axially penetrates the actuator housing part (3, 4) and configures a flange face for a fitting flange.

12. The actuator (1) as claimed in claim 1, wherein the at least one actuator housing part comprises first and second pot-shaped actuator housing parts, and the actuator housing (2) is sealed by a seal along an encircling line formed by a bent feature of at least one of the first or second pot-shaped actuator housing part (3, 4).

13. The actuator (1) as claimed in claim 12, wherein at least one of the first or second pot-shaped actuator housing part (3, 4) is formed of thin-walled material.

14. The actuator (1) as claimed in claim 12, wherein the first and second actuator housing parts (3, 4) are connected to at least one of one another or to the upper component support (6) by at least one tensioning element (14).

15. The actuator (1) as claimed in claim 1, further comprising a closure aperture (23) in which at least one cable conduit (24) for a connector cable is configured and by which an assembly window (22) is adapted to be closed upon assembling the actuator (1), and the closure aperture (23) is configured to be at least one of released or completely removed from the outside.

16. The actuator (1) as claimed in claim 15, wherein the closure aperture (23) has at least one of a ventilating or venting bore (25) which has a pressure compensation element which is permeable to at least one of air or vapor but impermeable to water.

17. The actuator (1) as claimed in claim 15, wherein at least one cable conduit (24) of the closure aperture (23) is configured as at least one of a cable screw- fitting or a plug connection.

18. The actuator (1) as claimed in claim 1, wherein the at least one actuator housing part (3, 4) has a flange (18) that includes at least one slot (19) for receiving a tensioning screw (17) of a tensioning element (14) and is open on a periphery thereof.

19. The actuator (1) as claimed in claim 18, wherein the tensioning element (14) comprises a holding bracket (15), a round nut (16) which is held by the holding bracket (15), and the tensioning screw (17), wherein the round nut (16) is rotatable in the holding bracket (15) so as to move the tensioning screw (17) to a tensioning position.

20. The actuator (1) as claimed in claim 19, wherein the at least one actuator housing part (3, 4) includes at least one of a holding bead or a flared holding rim (20) for the holding bracket (15).

21. The actuator (1) as claimed in claim 20, wherein the holding bracket (15) has a centric recess (21) such that the round nut (16) having the tensioning screw (17) within the holding bracket (15) is movable between an open position and the tensioning position.

* * * * *